United States Patent
Liu et al.

(10) Patent No.: US 11,405,404 B2
(45) Date of Patent: Aug. 2, 2022

(54) DYNAMIC PRIVILEGE ALLOCATION BASED ON COGNITIVE MULTIPLE-FACTOR EVALUATION

(71) Applicant: International Business Machines Corporation, Armonk, NY (US)

(72) Inventors: Su Liu, Austin, TX (US); Xinya Wang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 16/563,455

(22) Filed: Sep. 6, 2019

(65) Prior Publication Data
US 2021/0075795 A1    Mar. 11, 2021

(51) Int. Cl.
*H04L 29/06* (2006.01)
*H04L 9/40* (2022.01)
(Continued)

(52) U.S. Cl.
CPC .......... *H04L 63/105* (2013.01); *H04L 63/083* (2013.01); *H04L 63/0876* (2013.01);
(Continued)

(58) Field of Classification Search
CPC . H04L 63/083; H04L 63/0876; H04L 63/105; H04L 63/107; G06N 20/00;
(Continued)

(56) References Cited

U.S. PATENT DOCUMENTS

| 5,684,957 A | 11/1997 | Kondo et al. |
| 6,023,765 A | 2/2000 | Kuhn |

(Continued)

FOREIGN PATENT DOCUMENTS

| CN | 107833456 A | * | 3/2018 | ............. G06Q 50/26 |
| CN | 107995146 A | * | 5/2018 | ......... H04L 63/0815 |

(Continued)

OTHER PUBLICATIONS

Chow et al., Authentication in the Clouds: A Framework and its Application to Mobile Users, CCSW'10, Oct. 8, 2010, Chicago, Illinois, USA, 2010.

(Continued)

*Primary Examiner* — Richard A McCoy
(74) *Attorney, Agent, or Firm* — Garg Law Firm, PLLC; Rakesh Garg; Nathan Rau

(57) ABSTRACT

In an embodiment, a method for allocating privileges on a computer network includes calculating a permission level based at least in part on a login context associated with a login request for connection to a network from a user via a client device, adjusting the calculated permission level such that a resulting first adjusted permission level does not exceed a previous permission level assigned to the client device, assigning the first adjusted permission level to the client device, collecting activity data representative of network activity by the user while logged in to the network, and classifying, using a classifier model, at least a portion of the activity data to generate a second adjusted permission level for the client device.

18 Claims, 5 Drawing Sheets

(51) Int. Cl.
*H04W 12/06* (2021.01)
*H04W 12/08* (2021.01)
*G06N 20/00* (2019.01)

(52) U.S. Cl.
CPC .......... *H04L 63/107* (2013.01); *H04W 12/06* (2013.01); *H04W 12/08* (2013.01); *G06N 20/00* (2019.01)

(58) Field of Classification Search
CPC ... H04W 12/08; H04W 12/086; H04W 12/60; H04W 12/63; H04W 12/67; H04W 12/69; H04W 12/71
See application file for complete search history.

(56) References Cited

U.S. PATENT DOCUMENTS

| | | | |
|---|---|---|---|
| 7,185,192 B1* | 2/2007 | Kahn | G06F 21/6218 707/999.102 |
| 8,365,266 B2 | 1/2013 | Bogner | |
| 8,590,018 B2 | 11/2013 | Thavasi et al. | |
| 8,667,122 B2* | 3/2014 | Halla-Aho | H04W 4/029 709/200 |
| 9,548,996 B2 | 1/2017 | Meredith et al. | |
| 10,027,842 B2 | 7/2018 | Haba et al. | |
| 10,348,561 B1* | 7/2019 | Caine | H04L 67/1095 |
| 2004/0083394 A1 | 4/2004 | Brebner et al. | |
| 2005/0044379 A1* | 2/2005 | Beard | H04L 9/321 713/182 |
| 2005/0091213 A1* | 4/2005 | Schutz | G06F 21/31 |
| 2007/0038548 A1* | 2/2007 | Schlifstein | G06Q 40/00 705/37 |
| 2009/0216886 A1* | 8/2009 | Zhu | H04L 69/14 709/227 |
| 2011/0314558 A1 | 12/2011 | Song et al. | |
| 2014/0157381 A1* | 6/2014 | Disraeli | H04W 4/02 726/7 |
| 2015/0089568 A1* | 3/2015 | Sprague | H04L 63/06 726/1 |
| 2015/0089585 A1* | 3/2015 | Novack | H04L 63/1433 726/3 |
| 2015/0195301 A1 | 7/2015 | Bhargav-Spantzel et al. | |
| 2019/0332824 A1* | 10/2019 | Patwardhan | H04W 4/029 |
| 2020/0076819 A1* | 3/2020 | Spurlock | H04L 63/10 |

FOREIGN PATENT DOCUMENTS

| | | | | |
|---|---|---|---|---|
| GB | 2510120 A | | 7/2014 | |
| TW | 201706901 A | * | 2/2017 | ......... H04L 63/0876 |
| WO | WO-2015117396 A1 | * | 8/2015 | ............... G01S 5/02 |

OTHER PUBLICATIONS

IBM, Multi-level security, 2019, https://www.ibm.com/support/knowledgecenter/en/ssw_aix_71/security/taix_mls.html.

Cisco.com, Understanding Switch Security, 2003, https://slideplayer.com/slide/10798631/.

Bhat et al., Deep learning frameworks—Pytorch and Caffe2 with ONNX support on IBM AIX, Jul. 22, 2019.

Botz, Authority and Privilege: What's the Difference?, IBM Systems Magazine, Jun. 2015.

Debanks, The Intersection of Privileged Access Management & Identity Access Management—Part 1, Apr. 9, 2019.

Jeyapaul, Archived | Role-based access control in simple steps, IBM Developer, Jun. 23, 2009.

* cited by examiner

*FIGURE 4*

| USER ID | ROLELIST FROM DEVICE (CURRENT ROLE, PRIVILEGE BITS) 408 | FROM DEVICE (MAC ADDRESS, SECURITY-LEVEL, LOCATION) 410 | ROLELIST TARGET DEVICE (ORIGINAL ROLE, PRIVILEGE BITS) 412 | TARGET DEVICE (MAC ADDRESS, SECURITY-LEVEL, LOCATION) 414 | CONNECTED TYPE (0~10) 416 | CONTEXT TRUST SCORE 418 | PRIVILEGE BITS 420 | LOGIN TIME | LOGOFF TIME |
|---|---|---|---|---|---|---|---|---|---|
| USER – 1 402 | DEVICE – 1 (ADMIN, 1111) | 00:01:00:01:00:11 4, OFFICE | DEVICE – 3 (ADMIN, 1111) | 00:01:00:01:00:01 1, LAB | INTRANET (8) | 8 | 1111 | NA | NA |
| USER – 1 404 | DEVICE – 1 (DEVELOPER, 0011) | 00:01:00:01:00:11 1, LAB | DEVICE – 3 (ADMIN, 1111) | 00:01:00:01:00:01 1, LAB | CONSOLE(10) | 7.75 | 0011 | NA | NA |
| USER – 1 406 | DEVICE – 2 (TESTER, 0001) | 00:01:00:01:01:11 4, HOME | DEVICE – 3 (ADMIN, 1111) | 00:01:00:01:00:01 1, LAB | INTERNET(4) | 2.75 | 0001 | NA | NA |

INPUT DATA / OUTPUT DATA

LEGEND 422

ROLE ( R ): 0 – 10 (ADMIN = 10, DEVELOPER = 5, TESTER = 1)
SECURITY LEVEL (S): 0 – 10 (SL 1, 2, 3, 4 = 8, 6, 4, 2)
LOCATION (L): 0 – 10 (DATACENTER = 10, LAB = 8, OFFICE = 6, HOME = 4, PUBLIC = 2)
CONNECTION ( C): 0 – 10 (CONSOLE = 10, INTRANET = 8, INTERNET = 4)
───────────────
CONTEXT TRUST SCORE (CTS) = Σ(R, S, L, C)/4

DYNAMIC PRIVILEGE ALLOCATION BASED ON COGNITIVE MULTIPLE-FACTOR EVALUATION

TECHNICAL FIELD

The present invention relates generally to security of computer systems, and more particularly relates to management of user access and privileges on computers, computer networks, and the like by dynamic privilege allocation based on cognitive multiple-factor evaluation.

BACKGROUND

Identity and access management (IAM) controls user access to a network, including authenticating the user's identity and verifying that the user request is within the user's access rights. IAM typically authenticates users by checking the validity of login credentials, e.g., username and password, provided by the user. If the IAM system authenticates the user, the IAM system will grant the user access to requested resources on the network, but there will usually be limits to that access. The user's limited abilities are referred to as permissions or privileges, which are governed by privileged access management (PAM).

PAM provides a framework for network administrators to define user roles that correspond to different levels of access control according to administrator policies. PAM can secure network resources and facilitate compliance with network policies by enforcing Role Based Access Control (RBAC). RBAC uses a predefined set of rules to enforce privileges granted to users grouped into different roles. PAM assigns privileges to each role and assigns a role to each user. Thus, rather than configure each user's privileges individually, PAM can configure privileges assigned to a role, which will equally affect all users assigned to that role.

SUMMARY

The illustrative embodiments allocate privileges on a computer network. An embodiment includes calculating, by the server, a permission level based at least in part on a login context associated with a login request for connection to a network from a user via a client device. The embodiment also includes adjusting, by the server, the calculated permission level such that a resulting first adjusted permission level does not exceed a previous permission level assigned to the client device. The embodiment also includes assigning, by the server, the first adjusted permission level to the client device. The embodiment also includes collecting, by the server, activity data representative of network activity by the user while logged in to the network. The embodiment also includes classifying, by the server using a classifier model, at least a portion of the activity data to generate a second adjusted permission level for the client device. Other embodiments of this aspect include corresponding computer systems, apparatus, and computer programs recorded on one or more computer storage devices, each configured to perform the actions of the embodiment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 4 depicts a block diagram of an embodiment of a Context Trust Score (CTS) calculations table generated by the Context Trust Score (CTS) engine in accordance with an illustrative embodiment.

DETAILED DESCRIPTION

Figure 1:
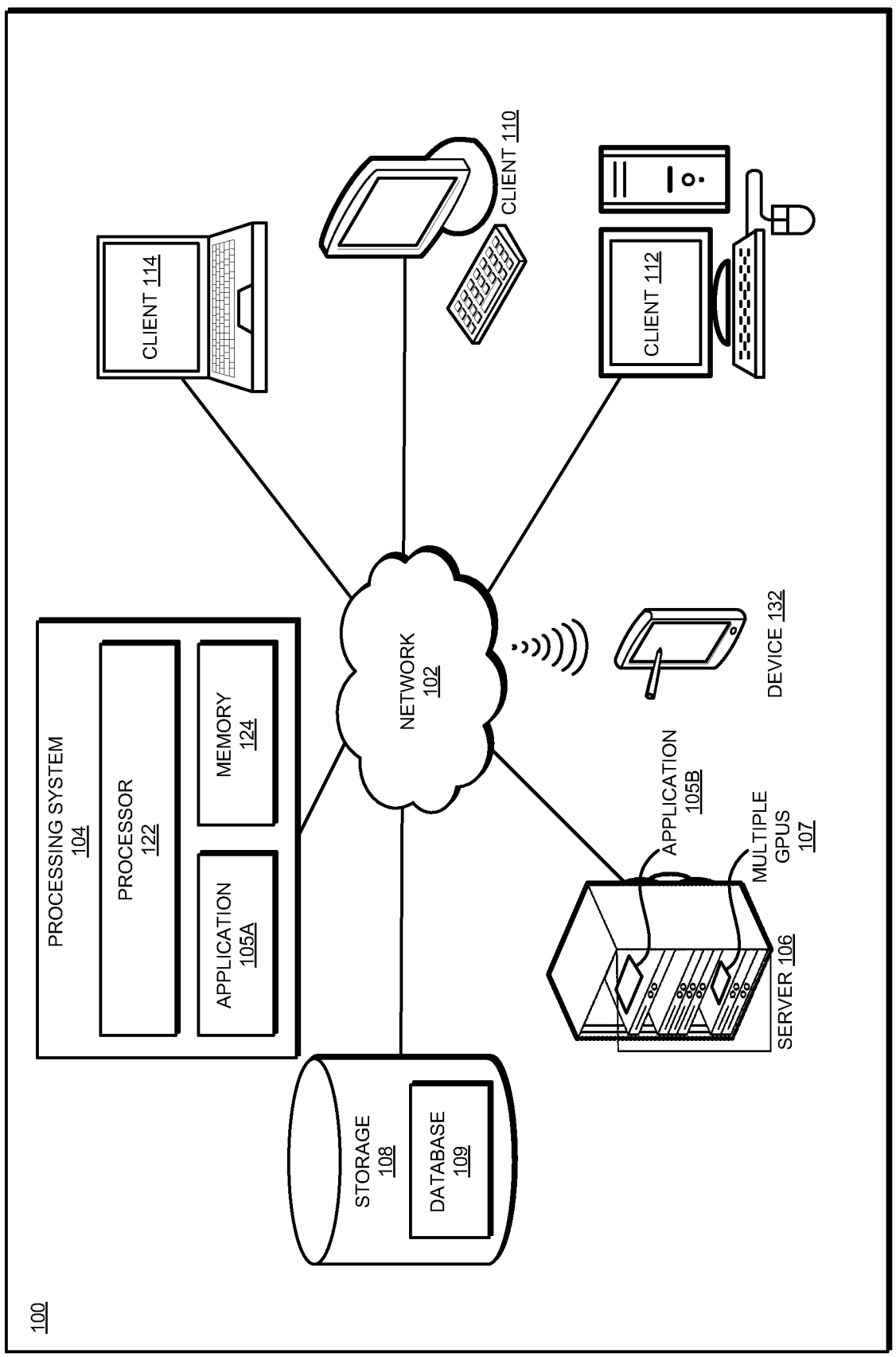
FIG. 1 depicts a block diagram of a network of data processing systems in which illustrative embodiments may be implemented.

While access and privilege management systems are helpful in providing network security, they remain vulnerable to unauthorized users who discover valid credentials and to legitimate users who have malicious intent. Current access and privilege management systems are Role Based Access Control (RBAC). RBAC uses a predefined set of rules to enforce privileges granted to users grouped into different roles. A problem with current systems is that they grant the same access and privileges to upon authenticating a user's login credentials. As a result, current systems do not guard against authentic but malicious users that repeatedly committed unauthorized actions during prior sessions. Current systems also do not guard against unauthorized users who gain access using someone else's credentials.

The illustrative embodiments recognize that there is a need to improve network security and authorization systems by providing a Cognitive Device-login Based Multi-level Privilege Management (CDLB-MPM) system that can detect potentially malicious or unauthorized users accessing a network and reduce the privileges granted to those users to mitigate loss. For example, a CDLB-MPM system can analyze various parameters associated with a login request to detect a potential security risk. As another example, a CDLB-MPM system periodically or continuously monitors and evaluates user activity based on user history and other examples of user behavior and provides alerts and privilege adjustments based on the evaluations.

In one example implementation, an embodiment can be configured such that a CDLB-MPM system monitors network ports and detects an incoming request for a network connection. In an embodiment, the CDLB-MPM system includes an authenticator that responds to requests for network access. For example, in an embodiment, the authenticator determines if an access request includes valid authentication credentials. In an embodiment, the authenticator determines whether the received authentication credentials match a previously-created version of the user's authentication credentials stored in an authentication database.

In an embodiment, when a requesting entity is authenticated for network access, the CDLB-MPM system will grant a level of privileges for the requesting entity as part of the initial handshake. In some embodiments, the CDLB-MPM system assigns the requesting entity to a role that corresponds to a level of privileges.

In an illustrative embodiment, the CDLB-MPM system decides on an appropriate level of privileges for the requesting entity based on a Context Trust Score (CTS). In an embodiment, the CTS is calculated based on attributes of the network connection between the CDLB-MPM system and the requesting entity. In an embodiment, the CTS is a numeric value that is proportional, or inversely proportional, to the security risk detected by the CDLB-MPM system for the network access requested by the requesting entity. In some embodiments, the CTS is a list of factors that potentially indicate an attempted unauthorized access or malicious activity, where the appropriate privilege level is based on the number of factors present in the network access request.

In an embodiment, at least some of the connection attributes are detected by the CDLB-MPM system. For example, in an embodiment, the access request includes header information that provides a MAC address and IP address for the requesting entity, and the CDLB-MPM system uses the MAC address to detect the device used by the requesting entity to connect to the network (e.g., smartphone, laptop, desktop) and uses the IP address to detect the geo-location of the requesting entity. In an embodiment, at least some of the attributes will be, or previously were, provided by the requesting entity.

In an embodiment, the CDLB-MPM system constructs a login context for the requesting entity. For example, in an embodiment, the CDLB-MPM system assembles a login context based on a data structure previously stored in a database, such as an authentication database. According to one non-limiting example, a login context for the requesting entity includes data about the requesting entity (e.g., username, current role), data about the remote, or "from," device (e.g., MAC address, security level, geo-location), data about the target device (e.g., MAC address, security level, geo-location), data about the type of connection (e.g., WiFi, LAN, VPN), and the Context Trust Score (CTS).

In an illustrative embodiment, the CDLB-MPM system uses the CTS value to determine a tentative privilege level, and then weighs other factors before finalizing the privilege level to assign to the requesting entity. For example, in an embodiment, the CDLB-MPM system determines if there is a previously-assigned role or privilege level for the user and/or either of the from and target devices involved in the network connection requested by the requesting entity. In such embodiments, the CDLB-MPM system compares the tentative privilege level to the previously-assigned privilege level and, if the tentative privilege level exceeds the previously-assigned privilege level, the CDLB-MPM system lowers the tentative privilege level to be less than or equal to the previously-assigned privilege level.

In some embodiments, once a user is connected to the network associated with the CDLB-MPM system, the CDLB-MPM system monitors the user's data access behavior (read, write, download, accessed files/paths). In some embodiments, the CDLB-MPM system tracks a user's data access behavior by integrating application logs stored in primary storage and determining usage patterns, errors, and/or anomalies in the logs. In some embodiments, the CDLB-MPM system monitors access patterns for the data and alerts designated administrators regarding inconsistent behavior, such as possible signs of security issues.

In some embodiments, the CDLB-MPM system takes a series of actions responsive to detecting potential malicious behavior on the network. For example, in some embodiments, the CDLB-MPM system adjusts the user's configuration settings or privileges. In some embodiments, the CDLB-MPM system uses machine-learning methods to detect malicious behavior, for example by inputting actions by the user, such as number and type of files affected (i.e., hundreds of source code files, or dozens of old text files) and/or types of (e.g., files moved, modified, or deleted) actions, and getting an artificial intelligence prediction of whether the behavior appears to be malicious behavior as opposed to file maintenance or other such activity. In some embodiments, the CDLB-MPM system uses machine learning techniques to determine an updated privilege level, for example based on user actions on the network. For example, a machine learning model outputs a same or revised set of user privileges base on the user actions input to the system.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
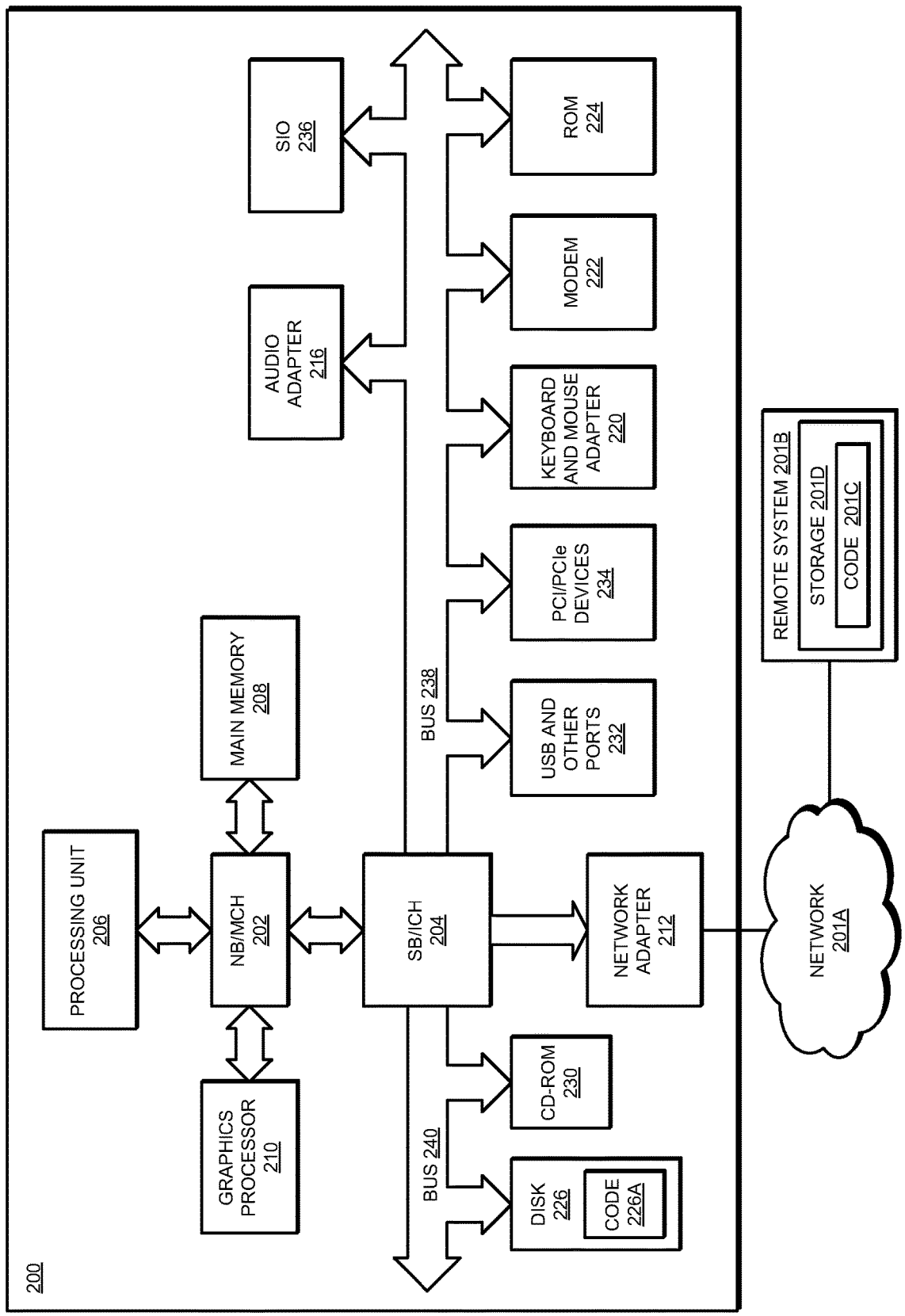
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example login context data. Server 106 is a conventional data processing system. In an embodiment, server 106 includes neural network application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In an embodiment, one or more of neural network application 105A of data processing system 104 and neural network application 105B of server 106 implements an embodiment of a neural network, such as a DNN, as described herein. In a particular embodiment, the neural network is implemented using one of network application 105A and network application 105B within a single server or processing system. In another particular embodiment, the neural network is implemented using both network application 105A and network application 105B within a single server or processing system. Server 106 includes multiple GPUs 107 including multiple nodes in which each node may include one or more GPUs as described herein.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
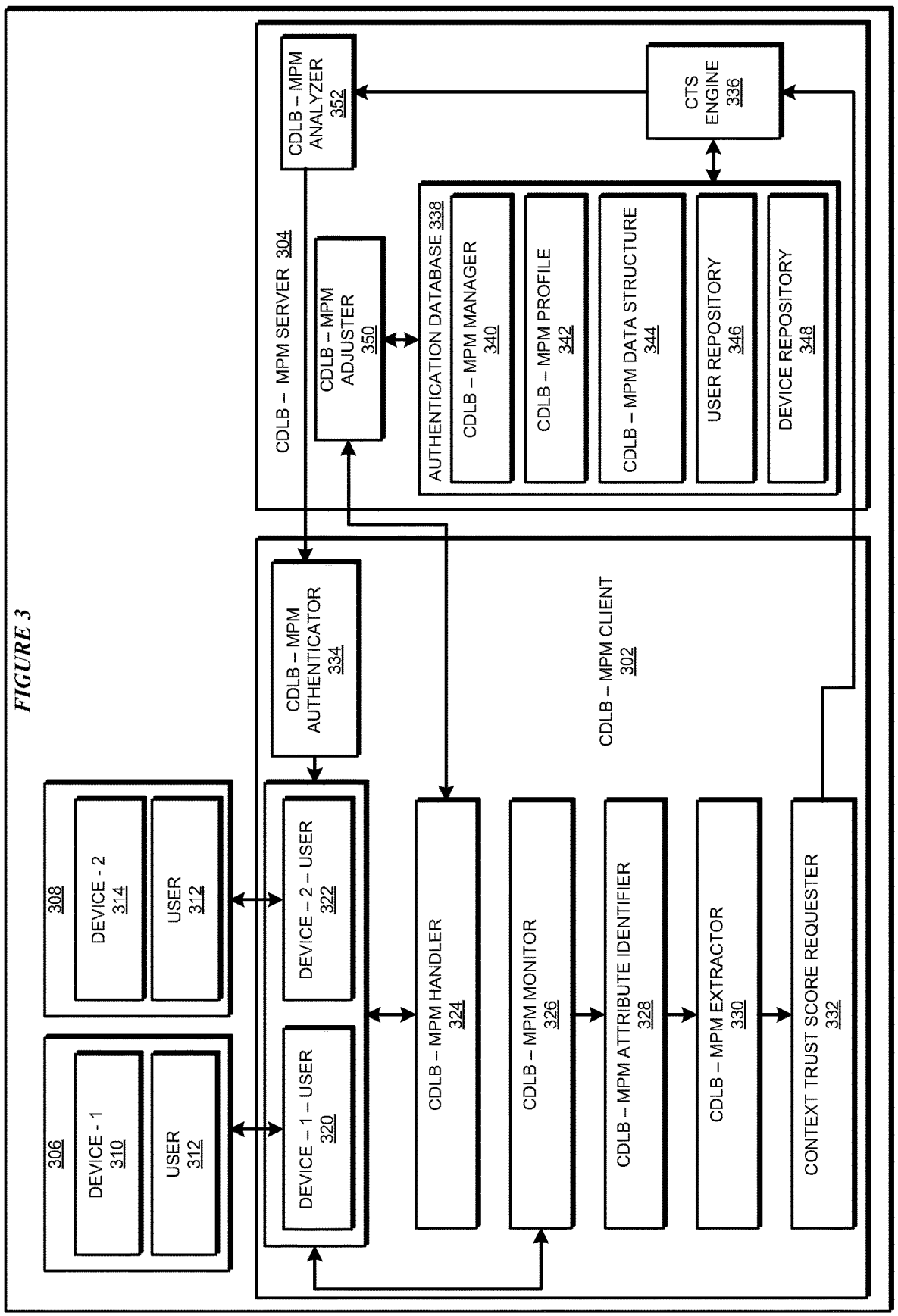
FIG. 3 depicts a block diagram of a Cognitive Device-login Based Multi-level Privilege Management (CDLB-MPM) system in accordance with an illustrative embodiment.

With reference to FIG. 3, this figure depicts a block diagram of a Cognitive Device-login Based Multi-level Privilege Management (CDLB-MPM) system 300 in accordance with an illustrative embodiment. In a particular embodiment, CDLB-MPM system 300 is an example of application 105A/105B of FIG. 1. In some embodiments, the system 300 includes a CDLB-MPM client side interface 302 (or client 302) and a CDLB-MPM server side interface 304 (or server 304). Alternative embodiments can distribute modules of the CDLB-MPM system among multiple computer systems. For example, in some embodiments, the tasks of the CDLB-MPM system can be split intto client and server parts such that the CDLB-MPM client 302 components are on one computer system that requests and receives CDLB-MPM service from another computer system that has the CDLB-MPM server 304 components.

In the illustrative embodiment, a user 312 sends a first request 320 for a first network connection 306 using a first device 310 and sends a second request 322 for a second network connection 308 using a second device 314. In some embodiments, the user 312 sends the second request 322 while the first device 310 is connected to the network or awaiting authentication to the network. In some embodiments, the user 312 sends the second request 322 while the first device 310 is not connected to the network or awaiting authentication to the network. In some embodiments, the user 312 sends the first and second requests 320, 322 from the same location. In some embodiments, the user 312 sends the first and second requests 320, 322 from different locations. In some embodiments, the first and second devices 310, 314 use Hypertext Transfer Protocol Secure (HTTPS) for the first and second requests 320, 322.

In some embodiments, the client 302 receives the first and second requests 320, 322 from the user 312 and, in response, performs authentication and privilege rights processing. In some embodiments, the client 302 includes an authenticator 334. In some embodiments, the authenticator 334 includes a module for executing a login process in response to the requests 320, 322 for network access. In some embodiments, the authenticator 334 determines if the requests 320, 322 include authentication credentials, for example a username and password. In some embodiments, upon determining that the authentication requests 320, 322 include authentication credentials, the authenticator 334 executes an evaluation process using the authentication credentials. For example, in some embodiments, the authenticator 334 determines whether the received authentication credentials matches a previously-created version of the user's authentication credentials stored in an CDLB-MPM authentication database 338 (or authentication database).

In some embodiments, once the authenticator 334 determines that the user 312 input valid authentication credentials, the client 302 sets role and privileges for the user 312. However, illustrative embodiments consider attributes of the login request when setting user privileges. Thus, as discussed in greater detail below, the client 302 determines appropriate privileges for the user 312 by retrieving a login context for the user 312, extracting data from the context and wrapping the data in a request to the server 304 for a Context Trust Score (CTS). The server 304 responds to the CTS request by performing the calculation, analyzing the user's original role and related attributes, and responding to the client 302 with recommended privilege settings for the user 312. The client 302 receives the recommendation and sets the role and privileges for the user 312 accordingly. Thus, the user's login context influences the privileges granted to the user 312, and in some embodiments the login context includes the user's location and the device the user is using to send the login request. As a result, the privileges that the client 302 grants to the user 312 in response to the first request 320 are not necessarily the same as the privileges that the client 302 grants to the user 312 in response to the second request 322.

The client 302 begins the process of determining privileges and role for the user 312 by retrieving the login context for the user 312. In some embodiments, the authenticator 334 generates a login context for the authenticated user 312 using data from an authentication database 338.

In some embodiments, the client 302 comprises a CDLB-MPM monitor 326 (or monitor 326) that monitors each login event. In some embodiments, the monitor 326 is implemented as a computing unit, in hardware and/or software, and is programmed and/or positioned within system 300 to monitor and/or intercept network messages (e.g., packets) transmitted to and/or from the client 302. In some embodiments, monitor 326 is programmed and/or positioned to monitor and/or intercept login attempt related messages transmitted to and/or from the client 302.

In some embodiments, the client 302 comprises an attribute identifier 328 that identifies device login context and security attributes. In some embodiments, the attribute identifier 328 identifies one or more profiles or login contexts associated with a user based on matching username, email address, or other profile information. In some embodiments, the profile or login context of the one or more personas comprises one or more attributes populated with at least one portion of user attribute information of the user. In various embodiments, the one or more attributes of the user 312 comprises at least one of a name, an account name, a password, a geo location, or contact information of the user. In various embodiments, the one or more attributes of the user 312 comprises geo location information of a user device (e.g., the devices 310, 314) corresponding to the user 312.

In some embodiments, the client 302 comprises an extractor 330 that extracts and saves the login contexts and security attributes in the data structure 344. In some embodiments, the extractor 330 identifies and saves to RAM or other memory location portions of one or more profiles or login contexts associated with the user 312 as identified by attribute identifier 328. In some embodiments, the profile or login context of the one or more personas comprises one or more attributes populated with at least one portion of user attribute information of the user 312. In various embodiments, the one or more attributes of the user 312 comprises at least one of a name, an account name, a password, a geo location, or contact information of the user. In various embodiments, the one or more attributes of the user 312 comprises connection type, from device, target device, role list for from device, role list for target device, geo location information of a user device (e.g., the devices 310, 314) corresponding to the user 312.

In some embodiments, the client 302 comprises a CTS requester 332 that wraps logged-in user's login context information from the data structure 344 and sends a request to the server 304. For example, in some embodiments, the CTS requester 332 wraps the login context information for the user 312 extracted by the extractor 330 for transmission to the server 304. In some embodiments, the CTS requester 332 wraps the login context information for the user 312 in a data-serialization language, for example XML, JSON, or YAML, and then sends the wrapped request to the Context Trust Score Engine (CTS Engine) 336.

In some embodiments, the server 304 receives the CTS request from the CTS requester 332. In some embodiments, the server 304 comprises a CTS engine 336 that assesses the user information received in the CTS request and calculates a CTS for the user 312 as discussed in detail below. In some embodiments, the CTS engine 336 supplements the information about user 312 received from the CTS requester by retrieving information about the user 312 from the user repository 346 and the device repository 348. In some embodiments, the user repository 346 includes a user database for saving user related information (roles, devices, accounts, and privileges). In some embodiments, the device repository 348 includes a device database for saving user's device related information (security classification (Confidentiality, integrity, availability), location, roles, devices, accounts, and privileges).

In some embodiments, the authentication database 338 contains information for authenticating users and also identifies privileges previously assigned to the user 312. In some embodiments, the privileges previously assigned to the user 312 are associated with a role that was previously assigned to the user 312. In some embodiments, the authentication database 338 is located as shown on the server 304.

In some embodiments, the authentication database 338 comprises a manager 340, a profile 342, a data structure 344, a user repository 346, and a device repository 348. In some embodiments, the CDLB-MPM system 300 manages various computing systems described in the profile 342, e.g., servers, server racks, or Performance Optimized Datacenters (PODs) in factory or solutions environments, customer sites, and internal labs that are communicatively coupled over a network. In some such embodiments, the profile 342 includes connections and configuration parameters that are established and updated from time to time in order to manage such multiple computing machines.

In some embodiments, the manager 340 includes a user interface for configuring and managing the CDLB-MPM system 300. In some embodiments, the user interface includes a graphical user interface (GUI). In some embodiments, the user interface includes a command line interface (cli). In some embodiments, the user interface includes a web portal accessible via a web browser from a local device (i.e., connected via a local area network (LAN)), or from a remote device (i.e., connected via the Internet). In some embodiments, the manager 340 limits access to the user interface for configuring and managing the CDLB-MPM system 300. For example, in some embodiments, the manager 340 requires that a user have elevated privileges to access the user interface, such as systems management, systems administrator, or root privileges. In some embodiments, the manager 340 provides a mechanism by which a user gains write access to the authentication database 338, allowing the user to edit data associated with the CDLB-MPM system 300, such as the CDLB-MPM system profile 342, the CDLB-MPM system data structure 344, user information in a user repository 346, and device information in a device repository.

In some embodiments, the CDLB-MPM system profile 342 comprises one or more configuration files that include parameters that define at least a portion of the runtime environment of the system 300. For example, in some embodiments, the manager 340 includes tools to create, modify, and verify the syntax of the configuration files. In some embodiments, the configuration files include at least one plain text file that is created and modified using a text editor. In some embodiments, the configuration files include at least one file in a serialization format, for example Extensible Markup Language (XML), Yet Another Markup Language/YAML Ain't Markup Language (YAML), or JavaScript Object Notation (JSON) format.

In some embodiments, the system profile 342 includes one or more configuration files for defining one or more group or operation levels of varying scope and settings that fall within each level. Embodiments include any number of ways to organize the various settings and groups. As a non-limiting example, in some embodiments, the system profile 342 defines a system level, the scope of which includes all devices registered on the system 300, a profile level, the scope of which includes devices on a group by group basis as organized into profile groups, and a device level, the scope of which is a single device, allowing management of devices on an individual basis. In some embodiments, the CDLB-MPM profile 342 includes various parameter settings such as user roles (e.g., administrator/root, writer, reader, tester, developer, and customer supporter), devices (e.g., office computer, lab computer, laptop computer, and smartphone), network connections (e.g., Ethernet and internet Small Computer System Interface (iSCSI)), fiber connections (e.g., Fiber Channel (FC) and Fiber Channel over Ethernet (FcoE)), as well as types of Media Access Controller (MAC))/Worldwide Name (WWN) addresses, port and connection settings for repositories (e.g., software repositories and source-code repositories), and serial number (e.g., factory-default or virtual).

In some embodiments, the authentication database 338 comprises a CDLB-MPM system data structure 344 that collects and tracks a login context with security attributes for each user from each device. For example, some embodiments generate a login context with security attributes as an object in which information of each logged-in user is recorded, such as:

```
CDLB-MPM_Data [
    Username,
    RoleList_FromDevice(CurrentRole),
    FromDevice(
        MAC Address,
        Security-Level,
        Location),
    RoleList_TargetDevice (OriginalRole),
    TargetDevice (
        MAC Address,
        Security-Level,
        Location),
    ConntectedType,
    ContextTrustScore,
    LoginTime,
    LogoffTime].
```

In some embodiments, a "FromDevice" is the device that is requesting network access via the system 300 and the "TargetDevice" is the device to which the "FromDevice" is seeking to access. In some embodiments, the system 300 assigns a device role to each "FromDevice" and each "TargetDevice" where the device role refers to a group of devices with the same rules. In some embodiments, the device role depends at least in part on the type of device, the location of the device, and the kinds of information stored on the device. In some such embodiments, the system 300 assigns roles to devices based on a trust level, for example a lab computer storing sensitive information will be treated as more trustworthy than a smartphone that connecting from a remote location over a public WiFi and could potentially be in the possession of someone other than the authorized user.

In some embodiments, the media access control address (MAC address) of a device is a unique identifier assigned to a network interface controller (NIC). In some embodiments, the MAC address is used as a network address. In some embodiments, the security level is assigned to the device based on data and asset classification rules. In some embodiments, the security level is a letter grade or numeric value related to the trustworthiness of the device. In some embodiments, the security level is used to determine which device role the device will be assigned. In some embodiments, the security level depends at least in part on the type of device, the location of the device, and the kinds of information stored on the device. In some such embodiments, the system 300 assigns security levels to devices based on a trust level, for example a lab computer storing sensitive information will be treated as more trustworthy than a smartphone that connecting from a remote location over a public WiFi and could potentially be in the possession of someone other than the authorized user.

In some embodiments, the "ConnectedType" includes information indicative of how the remote device is connected to the system 300. For example, some embodiments designate a "ConnectedType" based on whether the remote system is connected using point-to-point connections, broadcast/multicast connections, or Multipoint connections. Point-to-point connections allow one device to communicate directly with exactly one other device. Broadcast/multicast connections allow a device to send one message out to the network, and have copies of that message delivered to multiple recipients. Multipoint connections allow one device to directly connect and deliver messages to multiple devices in parallel.

Some embodiments designate a "ConnectedType" based on whether the FromDevice is connected using broadband Internet, mobile internet, a Virtual Private Network (VPN), a Local Area Network (LAN), or a direct network. Broadband is an umbrella term for Internet accessing technologies that involve connecting from a fixed location and include Integrated Services Digital Network (ISDN), Digital Subscriber Line (DSL), fiber optic, and cable modem connections. Mobile Internet refers to accessing networks from anywhere via wireless connections, for example using a smartphone and a 4G or 5G cellular network communication protocol. VPNs are used to create a private network to exchange data securely over a public network, usually using a method called "tunneling" that involves encapsulating the data in some form of encryption. LANs are used to connect multiple local devices and computers to share information and access resources, usually within a close proximity of each other, such as within a building or in an adjacent building. A direct network is the simplest form of connectivity, where the connection is established between two devices directly.

In the illustrative embodiment, the CTS engine 336 calculates a CTS for a user based on selected data from the user's login context. For example, some embodiments designate certain data to use for calculating the CTS value. Some embodiments assign different weights or to each possible value of the designated properties, and then calculate or determine the CTS based on the weighted values. As a non-limiting example, some embodiments calculate a CTS as shown in FIG. 4 and described below.

In some embodiments, the client 302 comprises a handler 324 that tracks a user's data access behavior (read, write, download, accessed files/paths), and feedback. In some embodiments, the handler 324 tracks a user's data access behavior by integrating the application logs stored in primary storage and determining usage patterns, errors, and/or anomalies in the logs. In some embodiments, the handler 324 monitors access patterns for the data and alerts the server 304 and designated administrators on inconsistent behavior such as possible signs of security issues.

In some embodiments, the server 304 comprises an adjuster 350 that receives alerts from the handler 324 regarding unusual or inconsistent user behavior, e.g., unusual file access patters. In some embodiments, the adjuster 350 adjusts configuration settings for the user 312 if indicated to do so based on machine learning methods. In some embodiments, the adjuster includes a classifier model trained with data representative of suspicious network activity and associated effective privilege-level adjustments. The adjuster 350 uses the model to evaluate reported activity, and the model outputs a classification for classifying the reported activity according to a privilege-level adjustment that the model predicts will be effective in protecting the network from harm that could come from the detected activity. In some embodiments, the model will sometimes predict that no action is required, indicating that the reported activity does not rise to a level that requires a change in the user's privilege level. In some embodiments, the classifier model is based on a neural network or deep learning neural network architecture. In some embodiments, adjuster 350 receives the tracked information and user status from the handler 324 and uses the tracked information and user status to cognitively adjust user, device, role classification rules and criteria in the local user profile in the user repository 346, the device profile in the device repository 348, and the system profile information in the CDLB-MPM profile 342.

In some embodiments, the server 304 comprises an analyzer 352 that receives the CTS and user data from the user repository 346, such as the user's original roles, and device data from the device repository 348, such as the from-device attributes, and related privilege settings. In some embodiments, the analyzer 352 correlates the CTS to a set of user privileges. In some embodiments, the analyzer 352 includes a look-up table that the analyzer 352 uses to find a set of user privileges corresponding to the CTS. In some embodiments, the analyzer 352 uses artificial intelligence and machine-learning methods to determine a set of user privileges based on the CTS. In some embodiments, the analyzer 352 uses artificial intelligence and machine-learning methods to determine a set of user privileges based on the CTS and user data from the user repository 346, such as the user's original roles, and device data from the device repository 348, such as the from-device attributes, and related privilege settings. In some embodiments, the analyzer 352 responds to CTS request from the client 302 with the privileges that the analyzer 352 determined to be appropriate.

The authenticator 334 receives the recommendation from the analyzer 352 and sets the role and privileges for the user 312 accordingly. Thus, the user's login context influences the privileges granted to the user 312, and in some embodiments the login context includes the user's location and the device the user is using to send the login request, as well as type of connection or any other attribute as desired. As a result, the privileges that the client 302 grants to the user 312 in response to the first request 320 are not necessarily the same as the privileges that the client 302 grants to the user 312 in response to the second request 322.

With reference to FIG. 4, this figure depicts a block diagram of an embodiment of a CTS calculations table 400 generated by the CTS engine 336 in accordance with an illustrative embodiment.

In the illustrative embodiment, the table 400 includes three CTS calculations on respective rows 402, 404, 406. The illustrative embodiment shows input data in the first five columns 408, 410, 412, 414, and 416, and shows output data in the sixth and seventh columns 418 and 420.

In an embodiment, the input data is from login contexts for user 312 for three different authenticated sessions with system 300. The illustrative embodiment uses the current role of the "from" device in column 408, the security level and location of the "from" device in column 410, the original role of the target device in column 412, the security level and location of the target device in column 414, and the type of connection in column 416. In the illustrative embodiment, the CTS calculation involves calculating a value that will be in a range from zero to ten, the range including zero and ten. Alternative embodiments can result in other values, ranges of values, or even non-numerical values.

In the illustrative embodiment, the data from the login context converts to numeric values, and the calculation is performed, according to the information shown in legend 422. The legend in 422 shows non-limiting examples of attributes' values which can be used to calculate the CTS score. In the first example shown in row 402, the role of user 312 is originally an administrator in device-1 in office and is logging in to the lab machine (device-3) from his office over an intranet, resulting in a CTS score of 8 (column 418) and all four privilege bits are set high in column 420, which indicates a super-user. In the second example shown in row 404, the user device 310 (device-1 in column 408) is originally a developer device in the lab accessing lab machine (device-3). Although the final value is almost the same as that of the first row, the CTS engine 336 will not grant privileges that are higher than those originally granted to the user 312 or either of the devices 310 and and target device. Thus, since the device 310 had a role of developer with privilege bits 0011 in column 420, the highest role/privilege that the user will be granted is developer with privilege bits 0011 in column 420. In the third example shown in row 406, the user device 314 is originally a tester and is logging in the lab machine (device-3) from the user's home over the Internet, resulting in a CTS score of 2.75. Since the CTS engine 336 will not grant privileges that are higher than those originally granted to the user 312 or either of the devices 310 and the target device, and since the device 310 had a developer with privilege bits 0001, the highest role/privilege that the user will be granted is tester with privilege bits 0001.

Figure 5:
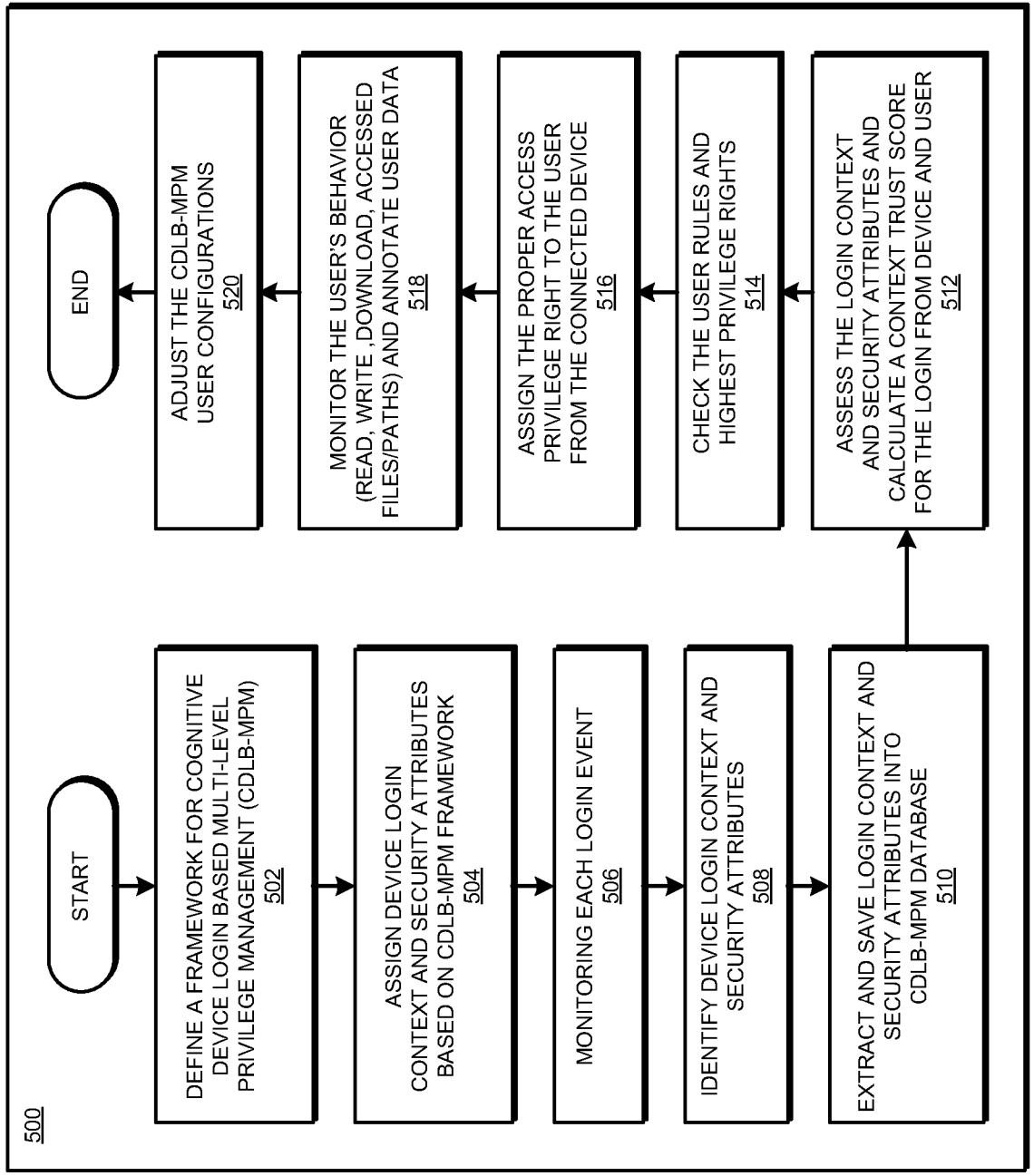
FIG. 5 depicts a flowchart of an example process for managing privilege allocation in accordance with an illustrative embodiment.

With reference to FIG. 5, this figure depicts a flowchart of an example process 500 for managing privilege allocation in accordance with an illustrative embodiment. In a particular embodiment, the CDLB-MPM system 300 carries out the process 500.

In an embodiment, at block 502, the process includes defining a framework for CDLB-MPM. In some embodiments, the process at block 502 includes creating a data structure for a login context that includes data fields for storing data representative of information regarding a login request, including information about the user, the origin or "From" device, and the target device, where the login request is being made by the user from the origin/from device to the target device. In some embodiments, the login context includes the user's role, the location of the origin device, the security level of the origin device, and the role of the origin device. In some embodiments, the login context includes the location of the target device, the security level of the target device, and the role of the target device. In some embodiments, the login context includes the type of connection, the mac address of the origin device, the mac address of the target device, and the username of the user.

In an embodiment, at block 504, the process includes assigning device login context and security attributes based on CDLB-MPM framework. In some embodiments, the process at block 504 creates a login context for a user as part of an authentication process.

In an embodiment, at block 506, the process includes monitoring each login event. In some embodiments, the process at block 506 includes implementing a monitor as a computing unit, in hardware and/or software, and programmed and/or positioned to monitor and/or intercept network messages (e.g., packets) transmitted to and/or from the client 302. In some embodiments, the process at block 506 includes implementing the monitor such that the monitor is programmed and/or positioned to monitor and/or intercept login attempts related messages transmitted to and/or from the client 302.

In an embodiment, at block 508, the process includes identifying device login context and security attributes. In some embodiments, the process includes identifying one or more profiles or login contexts associated with a user based on matching username, email address, or other profile information. In some embodiments, the process includes identifying a profile or login context of one or more personas comprising one or more attributes populated with at least one portion of user attribute information of the user. In various embodiments, the process includes identifying a profile or login context with one or more attributes of the user 312 comprising at least one of a name, an account name, a password, a geo location, or contact information of the user. In various embodiments, the process includes identifying a profile or login context having one or more attributes of the user 312 comprising geo location information of a user device (e.g., the devices 310, 314) corresponding to the user 312.

In an embodiment, at block 510, the process includes extracting and saving login context and security attributes into CDLB-MPM database. In some embodiments, the process includes identifying and saving to RAM or other memory location portions of one or more profiles or login contexts associated with the user 312 as identified at block 508. In some embodiments, the process includes extracting and saving the profile or login context of the one or more personas comprising one or more attributes populated with at least one portion of user attribute information of the user 312. In various embodiments, the process includes extracting and saving the one or more attributes of the user 312 comprising at least one of a name, an account name, a password, a geo location, or contact information of the user. In various embodiments, the process includes extracting and saving the one or more attributes of the user 312 comprising connection type, from device, target device, role list for from device, role list for target device, geo location information of a user device (e.g., the devices 310, 314) corresponding to the user 312.

In an embodiment, at block 512, the process includes assessing the login context and security attributes and calculating a CTS for the login from device and user. In some embodiments, the process includes designating certain data to use for calculating the CTS value. In some embodiments, the process includes assigning different weights or to each possible value of the designated properties, and then calculate or determine the CTS based on the weighted values.

In an embodiment, at block 514, the process includes checking the user's rules and the highest privilege rights. In some embodiments, the process includes checking the role and/or the privilege level of the user, the origin device, and the target device.

In an embodiment, at block 516, the process includes assigning the proper access privilege right to the user from the connected device. In some embodiments, the process includes assigning a privilege level associated with the results of the CTS calculation unless it exceeds the highest privilege level from among the privilege level of the user, the origin device, and the target device.

In an embodiment, at block 518, the process includes monitoring the user's behavior (read, write, download, accessed files/paths) and annotating user data. In some embodiments, the process includes tracking a user's data access behavior by integrating the application logs stored in primary storage and determining usage patterns, errors, and/or anomalies in the logs. In some embodiments, the process includes monitoring access patterns for the data and alerts the server 304 and designated administrators on inconsistent behavior such as possible signs of security issues.

In an embodiment, at block 520, the process includes adjusting the CDLB-MPM user configurations. In some embodiments, the process includes receiving the tracked information and user status and using the tracked information and user status to cognitively adjust user, device, role classification rules and criteria in memory.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
   receiving, by a target device, a login request message comprising a login request to establish a communications session between a target device and a client device, wherein the login request is initiated by a user via the client device, and wherein the login request message further comprises authentication credentials provided by the user;
   extracting, from the login request message, a login context, wherein the login context includes data representative of:
   a role of the user,
   a security level and a geographical location of the client device,
   a security level and location of the target device,
   a role of the target device, and
   a connection type of the communications session;
   calculating, by a server, a tentative permission level based at least in part on the login context associated with the login request; and
   adjusting, by the server, the tentative permission level such that a resulting first adjusted permission level does not exceed a previous permission level assigned to the client device;
   assigning, by the server, the first adjusted permission level to the client device,
   wherein the tentative permission level is adjusted to the first adjusted permission level prior to being assigned to the client device;
   collecting, by the server, activity data representative of network activity by the user while logged in to the network with the first adjusted permission level;
   classifying, during the communications session by the server using a classifier model, at least a portion of the activity data to generate a second adjusted permission level for the client device;
   assigning, by the server in a case wherein the second adjusted permission level is lower than the first adjusted permission level, the second adjusted permission level to the client device to control the communications session; and
   storing, by the server in the case wherein the second adjusted permission level is lower than the first adjusted permission level, the second adjusted permission level as a new value of the previous permission level.

2. The computer implemented method of claim 1, further comprising:
   training a neural network to classify network activities according to privilege-level adjustments using training data representative of suspicious network activity, the training resulting in the classifier model;
   receiving, by the server, the login request and associated login credentials for the user;
   responsive to the login request, establishing, by the server, an authenticated session with the client device; and
   receiving, during the authenticated session, an alert regarding the portion of the activity data,
   wherein the classifying comprises:
   inputting the portion of the activity data to the classifier model responsive to receiving the alert;
   receiving a privilege-level prediction from the classifier model based on the portion of the activity data; and
   generating the second adjusted permission level based on the privilege-level prediction.

3. The computer implemented method of claim 1, wherein the assigning of the first adjusted permission level comprises assigning a role having the first adjusted permission level.

4. The computer implemented method of claim 1, wherein the login context includes data representative of the previous permission level assigned to the client device.

5. The computer implemented method of claim 4, wherein the login context includes data representative of a MAC address of the client device.

6. The computer implemented method of claim 5, wherein the login request for connection to the network includes an indication of a target device with which the client device is requesting to connect, and wherein the login context includes data representative of information about the target device.

7. The computer implemented method of claim 6, wherein the calculating of the permission level comprises:
   determining a first preliminary permission level based on the role of the user;
   calculating a Context Trust Score (CTS) based at least in part on respective weighted values assigned to each of:
   the security level and the geographical location of the client device,
   the security level and location of the target device,
   the role of the target device, and
   the connection type of the communications session;
   calculating a second preliminary permission level from the CTS; and
   selecting a lower of the first preliminary permission level and the second preliminary permission level as the permission level.

8. A computer usable program product comprising a computer-readable storage device, and program instructions stored on the storage device, the stored program instructions comprising:
   program instructions to receive, by a target device, a login request message comprising a login request to establish a communications session between a target device and a client device, wherein the login request is initiated by a user via the client device, and wherein the login request message further comprises authentication credentials provided by the user;
   program instructions to extract, from the login request message, a login context, wherein the login context includes data representative of:
   a role of the user,
   a security level and a geographical location of the client device,
   a security level and location of the target device,
   a role of the target device, and
   a connection type of the communications session;
   program instructions to calculate, by a server, a tentative permission level based at least in part on the login context associated with the login request; and
   program instructions to adjust, by one or more processors, the tentative permission level such that a resulting first adjusted permission level does not exceed a previous permission level assigned to the client device;

program instructions to assign, by one or more processors, the first adjusted permission level to the client device, wherein the tentative permission level is adjusted to the first adjusted permission level prior to being assigned to the client device;

program instructions to collect, by one or more processors, activity data representative of network activity by the user while logged in to the network;

program instructions to classify, during the communications session by one or more processors using a classifier model, at least a portion of the activity data to generate a second adjusted permission level for the client device;

program instructions to assign, in a case wherein the second adjusted permission level is lower than the first adjusted permission level, the second adjusted permission level to the client device to control the communications session; and program instructions to store, in the case wherein the second adjusted permission level is lower than the first adjusted permission level, the second adjusted permission level as a new value of the previous permission level.

9. A computer usable program product of claim 8, further comprising:
program instructions to establish, by one or more processors and responsive to the login request, an authenticated session with the client device.

10. A computer usable program product of claim 8, wherein the program instructions to assign the first adjusted permission level comprises program instructions to assign a role having the first adjusted permission level.

11. A computer usable program product of claim 8, wherein the login context includes data representative of the previous permission level assigned to the client device.

12. A computer usable program product of claim 11, wherein the login context includes data representative of a MAC address of the client device.

13. A computer usable program product of claim 12, wherein the login request for connection to the network includes an indication of a target device with which the client device is requesting to connect, and wherein the login context includes data representative of information about the target device.

14. A computer usable program product of claim 13, wherein the program instructions to calculate the permission level includes program instructions to calculate a Context Trust Score (CTS) based at least in part on the geographical location of the client device, the MAC address of the client device, and information about the target device.

15. A computer system comprising a processor, a computer-readable memory, and a computer-readable storage device, and program instructions stored on the storage device for execution by the processor via the memory, the stored program instructions comprising:
program instructions to receive, by a target device, a login request message comprising a login request to establish a communications session between a target device and a client device, wherein the login request is initiated by a user via the client device, and wherein the login request message further comprises authentication credentials provided by the user;

program instructions to extract, from the login request message, a login context, wherein the login context includes data representative of:
a role of the user,
a security level and a geographical location of the client device,
a security level and location of the target device,
a role of the target device, and
a connection type of the communications session;

program instructions to calculate, by a server, a tentative permission level based at least in part on the login context associated with the login request; and program instructions to adjust, by one or more processors, the tentative permission level such that a resulting first adjusted permission level does not exceed a previous permission level assigned to the client device;

program instructions to assign, by one or more processors, the first adjusted permission level to the client device, wherein the tentative permission level is adjusted to the first adjusted permission level prior to being assigned to the client device;

program instructions to collect, by one or more processors, activity data representative of network activity by the user while logged in to the network;

program instructions to classify, during the communications session by one or more processors using a classifier model, at least a portion of the activity data to generate a second adjusted permission level for the client device;

program instructions to assign, in a case wherein the second adjusted permission level is lower than the first adjusted permission level, the second adjusted permission level to the client device to control the communications session; and program instructions to store, in the case wherein the second adjusted permission level is lower than the first adjusted permission level, the second adjusted permission level as a new value of the previous permission level.

16. The computer system of claim 15, further comprising:
program instructions to establish, by one or more processors and responsive to the login request, an authenticated session with the client device.

17. The computer system of claim 15, wherein the program instructions to assign the first adjusted permission level comprises program instructions to assign a role having the first adjusted permission level.

18. The computer system of claim 15, wherein the login request for connection to the network includes an indication of a target device with which the client device is requesting to connect,
wherein the login context includes data representative of data representative of the previous permission level assigned to the client device, and data representative of a MAC address of the client device, and
wherein the program instructions to calculate the permission level includes program instructions to calculate a Context Trust Score (CTS) based at least in part on the geographical location of the client device, the MAC address of the client device, and information about the target device.

* * * * *